April 2, 1957 G. R. BROCKWAY Re. 24,297

SHOPPING GUIDE

Original Filed April 4, 1950 2 Sheets-Sheet 1

Inventor
George Ralph Brockway
Jackson & Jenkins
Attorney

SHOPPING GUIDE
Original Filed April 4, 1950 2 Sheets-Sheet 2
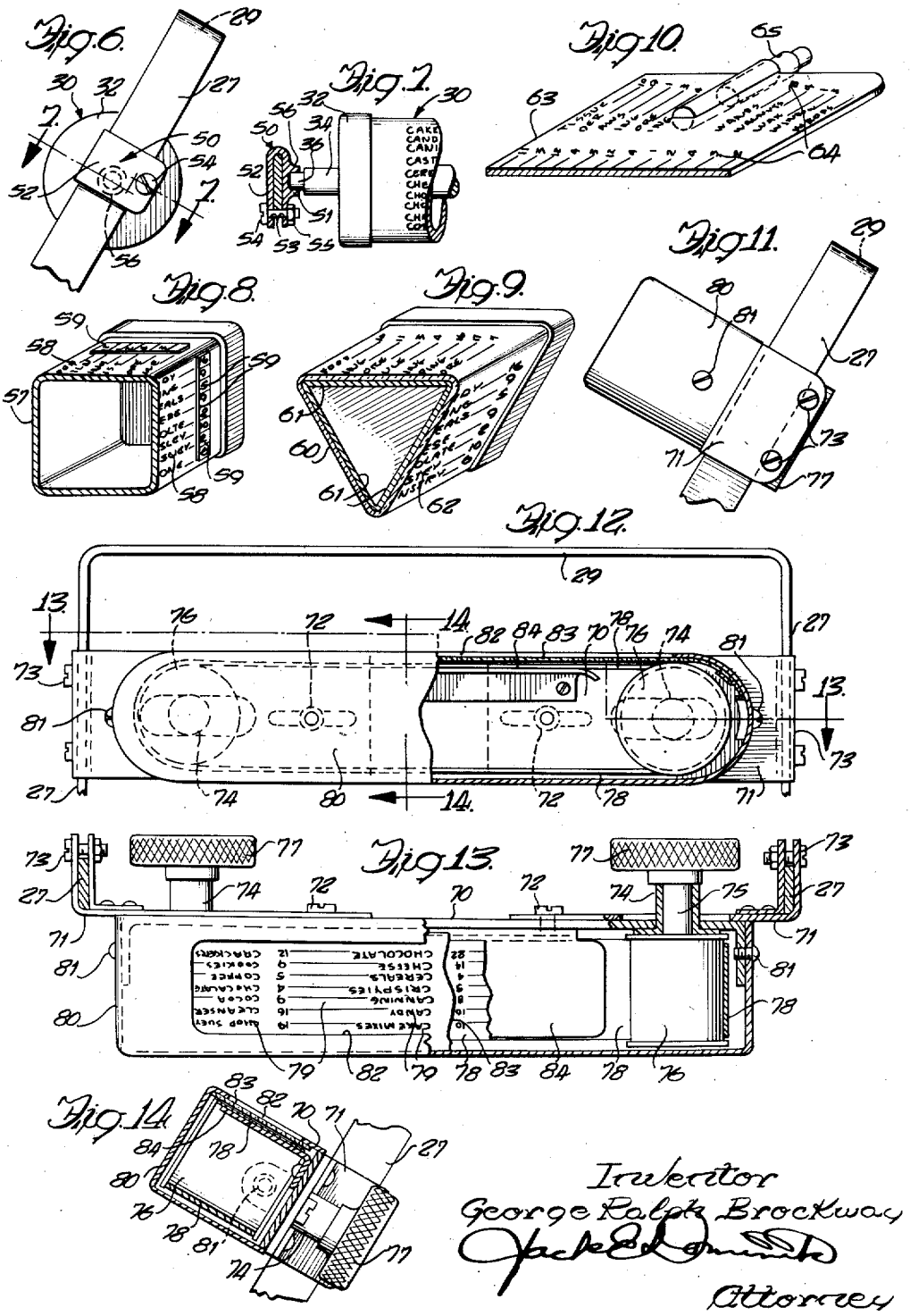
Inventor
George Ralph Brockway
Jacob E. Dominitz
Attorney United States Patent Office Re. 24,297
Reissued Apr. 2, 1957

24,297

SHOPPING GUIDE

George Ralph Brockway, Flint, Mich.

Original No. 2,687,589, dated August 31, 1954, Serial No. 153,977, April 4, 1950. Application for reissue February 14, 1956, Serial No. 565,524

4 Claims. (Cl. 40—68)

Matter enclosed in heavy brackets [ ] appears in the original patent but forms no part of this reissue specification; matter printed in italics indicates the additions made by reissue.

This invention comprises novel and useful improvements in shopping guides and more specifically pertains to information devices for use in self-serve stores where the customers are supplied with pushcarts in which articles picked up from shelves and tables are conveyed to the cashiers. *The present application is for the reissue of United States Patent No. 2,687,589 issued August 31, 1954.*

The primary object of the invention is to provide improved shopping guides attached to pushcarts adjacent the handles thereof with information thereon for assisting customers in the selections of articles desired to be purchased.

Another object of the invention is to provide a shopping guide with a novel and improved manner of presenting the customer with a large amount of easily readable information which takes up the minimum amount of space in an unoccupied area on a pushcart, which is readable from the position of a customer with his hands on the handle of the pushcart, and which is operable by the customer to present the information a portion at a time.

Another object of the invention is to provide improved shopping guides in accordance with the preceding objects which indicate thereon the location in the store of the shelves and tables on which different articles to be purchased are arranged, thereby saving time and unnecessary walking of the customers as well as eliminating to a great extent congestion in the store during rush hours.

A further object of the invention is to provide a shopping guide in conformity with the above-mentioned objects, wherein the information device is movable by fingers and/or thumbs of the hands of the customer while engaged about the handle of the pushcart to make different areas of information on the device visible to the customer while operating the pushcart in the customary manner.

A further object of the invention is to provide an improved shopping guide as set forth in the preceding objects which is detachably connected to and rotatably supported by the oppositely spaced arms that extend upwardly to the handles of the pushcart, and which is of a construction and arrangement for permitting convenient removal and disassembly thereof to change information thereon, and when supported on the pushcart will be held together as a single rotatable unit.

A still further object of the invention is to provide a shopping guide attached to a pushcart wherein the data is arranged on a belt trained about spaced manually rotatable rollers and is adapted to be moved to make different areas thereof visible to the operator of the pushcart upon rotation of either of said rollers.

It is also an object of the invention to provide novel and improved shopping guides of the above-indicated character, which are simple and substantial in construction, which can be manufactured economically, and which will be thoroughly efficient and practical in use.

These, together with various auxiliary features and objects of the invention which will later become apparent as the following description proceeds, are attained by the present invention, preferred embodiments of which have been illustrated, by way of examples only, in the accompanying drawings, wherein:

Figure 6 is a side elevation similar to Figure 4 illustrating a different manner of attachment of the shopping guide to a pushcart;

Figure 7 is a section taken on line 7—7 of Figure 6;

Figures 8, 9, and 10 are sectional perspective views illustrating different shaped body portions of the shopping guide and illustrating different manners of applying the information thereto;

Figure 11 is also a side elevation of the handle portion of the pushcart and shows a modified form of invention attached thereto;

Figure 12 is a front elevation and sectional view of the form of invention illustrated in Figure 11;

Figure 13 is a plan and sectional view taken substantially on line 13—13 of Figure 12; and Figure 14 is a cross section taken on line 14—14 of Figure 12.

Figure 1:
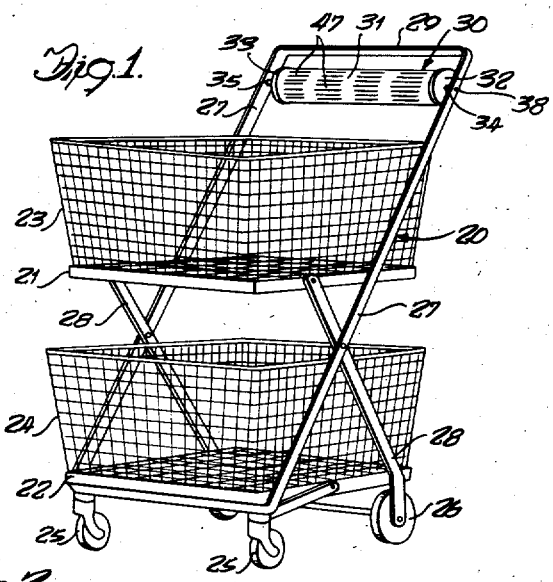
Figure 1 is a perspective view of a pushcart showing my improved shopping guide attached thereto.
Figure 2:
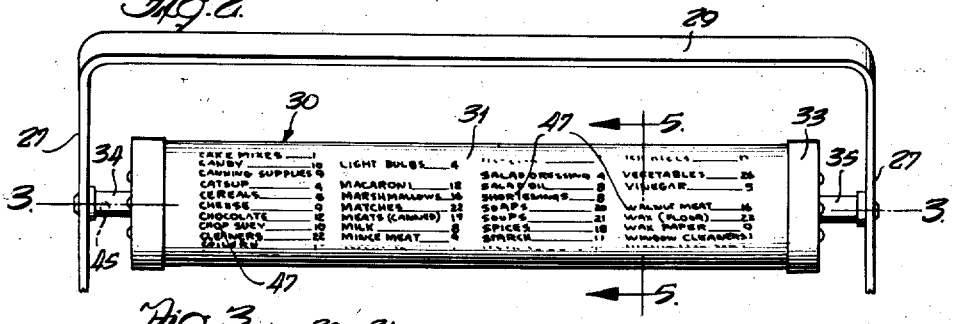
Figure 2 is a rear view of the handle portion of the pushcart with the shopping guide attached.

Referring now more specifically to the accompanying drawings, wherein like numerals designate similar parts throughout the various views, attention is directed first to Figure 1, wherein it will be seen that there is indicated generally by the numeral 20 a pushcart of a type used in self-serve food markets comprising upper and lower platforms 21 and 22 upon which the removable wire baskets 23 and 24, respectively, are placed and supported, front casters 25 and rear wheels 26 beneath the lower platform 22, two pairs of diagonal brace arms 27 and 28, one of each pair being connected together intermediate their ends and all supporting the upper platform 21 spaced above the lower platform 22, and a handle 29 extending across and joining the upper inclined ends of the arms 27, said handle being spaced above and slightly to the rear of the basket positioned upon the upper platform 21.

The improved shopping guide forming the subject of the form of invention illustrated in Figures 1 through 5 and indicated generally by the numeral 30 has a cylindrical body member 31 constructed of any approved transparent tubular material of a length in accordance with the distance between opposite side arms 27 of the pushcart 20 to which it is to be attached, and of a diameter according to the amount of information desired to be displayed. Slipped over the opposite ends of the cylindrical tube 31 are flanged end disks 32 and 33 in the form of end caps which support oppositely directed trunnions 34 and 35, respectively. Both trunnions 34 and 35 have their outer ends 36 reduced in diameter to provide shoulders 37 that engage annular ends of flanged holes 38 provided in the side arms 27 of the pushcart while said reduced ends 36 are rotatably supported in the holes 38.

Figure 3:
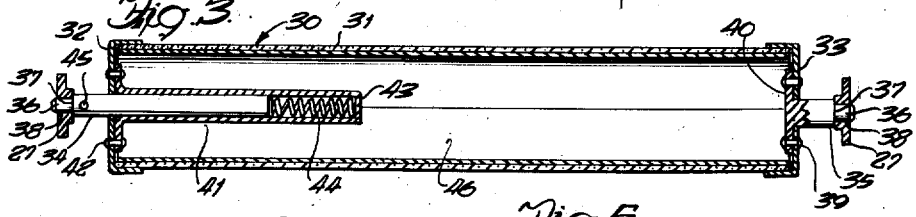
Figure 3 is a longitudinal section through the shopping guide taken on line 3—3 of Figure 2.
Figure 4:
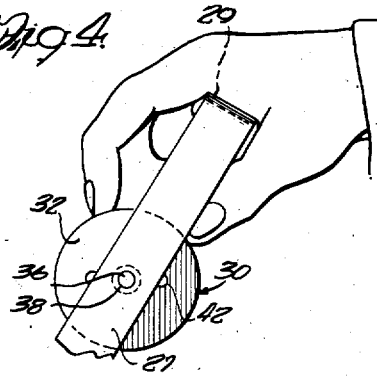
Figure 4 is a side elevation of the handle portion of a pushcart with the shopping guide thereon and showing a hand positioned on the handle with the fingers and thumb thereof in engagement with the guide.
Figure 5:
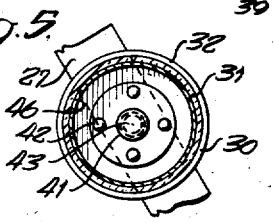
Figure 5 is a cross section through the shopping guide taken on line 5—5 of Figure 2.

The trunnion 35 is permanently attached to the end cap 33 by riveting or the like, as at 39, the end flange 40 of said trunnion to the inner side of the cap and extending the trunnion 35 through an opening centrally of said cap as clearly illustrated in Figure 3. In order that the shopping guide may be attached and detached from the arms 27 of the pushcart, the other trunnion 34 is slidably mounted in the outer end of a sleeve 41 attached to the inner side of the end cap 32, as at 42, and projected inwardly of said end cap, while the trunnion 34 extends through a hole centrally of the end cap and projects outwardly thereof. The inner end of the sleeve 41 is closed, as at 43, and between this closed end and the inner end of the trunnion 34 a coil spring 44 is located for yieldably applying an outward force to the trunnion 34. Thus, it can be seen that slight variations of distances between the side arms of different carts will not affect the mounting of the device to the arms as the spring 44 will adjustably locate the trunnion 34 to engage the shoulders 37 of both trunnions with the ends of the flanged holes 38. Slightly inward of the shoulder 37 in the trunnion 34 is provided a recess 45 into which a pointed tool may be placed for retracting the trunnion 34 to disengage the reduced end 36 thereof in the hole 38 when it is desired to detach the device from the pushcart.

Within the transparent cylindrical tube 31 and clinging closely to the inner surface of the wall thereof is a sheet of paper 46 or any other suitable material, having printed matter thereon, as indicated by the numeral 47, and legible through the transparent cylindrical tube 31. By having the sheet of paper 46 of a length equivalent to the circumference of the inner diameter of the transparent cylindrical tube and said sheet being normally in a flat state, the resiliency thereof when rolled to a cylindrical shape will cause the outer surface of the paper to spring into engagement with the inner surface of the cylinder. While I have shown the printed matter arranged alphabetically and have indicated by numerals the locations of the articles in a store, it is to be understood that any information for assisting a customer in the purchasing of articles in the store may be printed on the paper to be visible through the transparent cylindrical tube.

Referring now to Figures 6 and 7, it will be seen that there is illustrated a bracket 50 for attaching the shopping guide 30 to the arms 27 of pushcarts now in use and not provided with the flanged holes 30 as previously described. While but one bracket 50 is shown, it is to be understood that two are to support a shopping guide 30. The brackets 50 are each constructed in U-shaped formation for straddling an arm 27 with the leg 51 of said U-shape inward of the arm 27 and the leg 52 outward of said arm. Both legs are longer than the width of an arm 27, and in the ends of both, there are provided aligned holes 53 through which extends a bolt 54 with a nut 55 threaded thereon. By turning the nut on the bolt, the legs can be drawn together and clamped against the sides of the arms for holding the brackets in proper position on the arms. On the inner legs 51 of both U-shaped brackets, bearings 56 are formed into which the reduced ends 36 of the trunnions 34 and 35 are received and rotatably supported.

It will be observed that the distances between opposite bearings for rotatably supporting the shopping guide would be different when using the brackets 50 than when supporting the device in the holes 38 of the arms 27. Such slight differences while not supporting the body portion of the shopping guide equal distances away from each arm 27 will be cared for by the use of the spring 44 applying outward pressure on the trunnion 34. However, should such uneven spacing of the cylindrical body portion of said shopping guide be found objectionable due to different types of mounting of the device or different spacing of arms on different makes of pushcarts, all that is necessary to equally space the ends of the cylindrical body portion from the arms 27 would be to increase or shorten the length of the transparent cylindrical tube 31 during the manufacture according to the pushcart it is to be used upon.

Attention is now directed to Figures 8, 9, and 10 indicating the body portion of the shopping guide as square, triangular, and flat shapes, respectively, instead of circular as that previously described, and also illustrating other ways in which the data may be applied.

Figure 8, besides showing the body as constructed of a tube 57 square in cross section, also shows the material used in making the tube as being opaque plastic or similar material with the list of items 58 printed on the outside thereof and the space for indicating the locations of the items in the store left vacant so that the merchant in whose store the device is to be used may place plastic tape numbers 59, or apply numbers in any manner beside the various listed items according to the location of the articles in his particular store.

Figure 9, while showing a transparent tube 60, illustrates said tube as being triangular in cross section and, instead of having a single replaceable sheet of paper with printed matter thereon, has separate slides 61 of cardboard or similar stiff material with information 62 thereon positioned against the inside surface of each of the tube's three sides.

Figure 10, while not of tube formation, shows another way in which the rotatable body portion may be constructed and the data applied thereto. In this case, the body portion consists of a rectangular-shaped flat plate 63 with information 64 printed on opposite sides thereof, and to one end is shown the manner in which a trunnion 65 is attached for rotatably supporting the flat body to render either side thereof visible.

From the foregoing description, it can be seen that independent of the particular shape of the body portion, manner of applying the information, and specific way in which the holes are provided to rotatably receive and support the reduced ends 36 of the trunnions 34 and 35, the operation and principal advantages attained are the same.

In operation, the pushcarts with the shopping guides attached are available at the entrance to the store, and a customer entering may select a pushcart and proceed down the aisles between shelves and tables picking up and placing articles desired to be purchased in either of the baskets in the usual way.

Upon desiring to find and purchase an article and not knowing the location of same in the store, or for any other reason desiring to learn information contained on the shopping guide, the customer merely glances down and consults the reading matter on the shopping guide. Should the information desired not be visible or at an angle whereby it is not clearly readable, the fingers and/or thumbs of the hands engaged about the handle may be brought into engagement with the body portion of the guide to rotate and hold said guide until the information desired has been ascertained.

Should the articles in the store be rearranged, or when first putting the shopping guides into operation, it is necessary that the shopping guide be removed from the pushcart in order to change or replace printed matter according to the location of the various articles listed on the guide. To detach the guide from the pushcart, a pointed tool is engaged into the hole 45 in the trunnion 34 and pressure is applied to one side to withdraw the reduced end 36 of the trunnion 34 from engagement in the hole 38 of the side arm 27 of the pushcart. When the shopping guide is detached from the pushcart, both end caps 32 and 33 may be disengaged from about the ends of the tube by pulling said caps outwardly and away from one another. When the caps are removed, the ends of the tube are open and any printed matter therein may be removed and replaced with printed matter according to the rearrangement of the articles in the store.

Reference is now made to Figures 11 through 14 for an understanding of the construction and operation of the form of invention where the information is supplied on a belt manually moved to present portions of the data readable at a time.

A relatively heavy elongated plate 70 is supported below and to the forward side of the handle and between the arms 27 of the pushcart by brackets 71 adjustably attached to extend beyond the opposite ends thereof, as at 72, for connection to said arms 27, as at 73, which is a construction similar to that previously disclosed for attaching the brackets 50 to the arms. Adjacent each end of the plate 70 and projecting therethrough is a fixed bearing 74 through which extends a rotatable shaft 75 which has a roller 76 secured on one end thereof and at one side of the plate 70, and a hand-engaging knob 77 secured on the other end and at the opposite side of the plate. The rollers 76 are in the form of flanged pulleys which have trained thereabout an endless belt 78 with information 79 thereon. While no particular material from which the belt is constructed or manner of applying the reading matter thereto is shown, it is to be understood that the belt may be constructed of fabric adhered to paper with printing thereon, or may be of some elastic material with the reading matter applied directly thereto.

A lightweight housing 80, which together with said plate 70 encloses the rollers 76 and belt 78, is attached, as at 81, to the plate 70 and is provided with a window 82 in the upper wall thereof under which a run of the belt 78 between rollers 76 extends. Between said run of the belt and the wall of the housing having the window 82 therein is arranged a thin sheet of transparent material 83 through which the information on the belt is seen, while under said above-mentioned run of the belt and attached to the plate 70 is a belt-supporting plate 84 for holding the belt up and against the underside of the transparent material 83.

To move the belt 78 so he may read information thereon other than that visible through the window 82 at a particular time, the customer, while pushing the cart in the customary manner with both hands about the handle 29 thereof, may engage either of the knobs 77 with his fingers and/or thumbs and turn a knob to bring other portions of the belt into view through the window. The housing 80 can be conveniently removed by disconnecting the fastening elements 81 to gain access to the belt 78 to make changes to the information 79 thereon, or for substituting another belt with different data.

In view of the foregoing description taken in conjunction with the accompanying drawings, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. A shopping guide in combination with a pushcart having spaced arms connected to the opposite ends of a handle which extends across the pushcart rearwardly of an open top article-receiving and supporting basket also on said pushcart, said shopping guide comprising an elongated member supported adjacent each end thereof by the pushcart and located adjacent to and parallel with said handle [and rearwardly of the open top of the basket], information on opposite sides of said member, and means movably supporting said member so as to present the information a portion at a time by moving said member with hands of an operator. [while in the act of pushing the pushcart.]

2. A shopping guide in combination with a pushcart as set forth in claim 1 in which the movable member is an endless belt and there is included a casing enclosing said belt and having a window therein, and rotatable rollers mounted in said casing around which the belt is trained with a run thereof under said window.

3. A shopping guide in combination with a pushcart as set forth in claim 1 in which the movable member is an endless belt and there is included a casing enclosing said belt and having a window therein, rotatable rollers mounted in said casing around which the belt is trained with a run thereof under said window, and a knob exteriorly of said casing and connected to at least one of said rollers to be engaged by the fingers and/or thumbs for rotating a roller to move the belt.

4. A shopping guide in combination with a pushcart having spaced arms connected to the opposite ends of a handle [which extends across the pushcart rearwardly thereof], said shopping guide comprising a tubular member positioned [adjacent and] parallel to said handle, information on said tubular member, a pair of caps disconnected from each other and removably engaging over the ends of said tubular member, trunnions supported centrally on said caps and projecting outwardly therefrom, brackets clamped to [the arms of] said pushcart and positioned outwardly of said caps which limit outward endwise movement of said trunnions, said brackets having openings therein that rotatably receive said trunnions, and spring means urging at least one of said trunnions in an outward direction against its associated bracket and urging its associated cap inwardly against said tubular member and thereby yieldingly retaining both of said caps over the ends of said tubular member and both of said trunnions in said brackets.

References Cited in the file of this patent or the original patent

UNITED STATES PATENTS

| | | |
|---|---|---|
| 453,149 | Lefebvre | May 26, 1891 |
| 658,543 | Fowler | Sept. 25, 1900 |
| 820,697 | Brown et al. | May 14, 1906 |
| 848,298 | Ennis | Mar. 26, 1907 |
| 866,218 | Priser | Sept. 17, 1907 |
| 1,196,863 | Heusner | Sept. 5, 1916 |
| 1,546,992 | Oppman | July 21, 1925 |